Oct. 28, 1969   L. A. SMITZER ET AL   3,475,091
MICROFILM READER DEVICE
Filed June 28, 1966   3 Sheets-Sheet 1

INVENTORS:
Louis A. Smitzer,
Andrew I. Yohana.
By [signature] Atty

Oct. 28, 1969     L. A. SMITZER ET AL     3,475,091

MICROFILM READER DEVICE

Filed June 28, 1966     3 Sheets-Sheet 2

INVENTORS:
Louis A. Smitzer,
Andrew I. Yohana

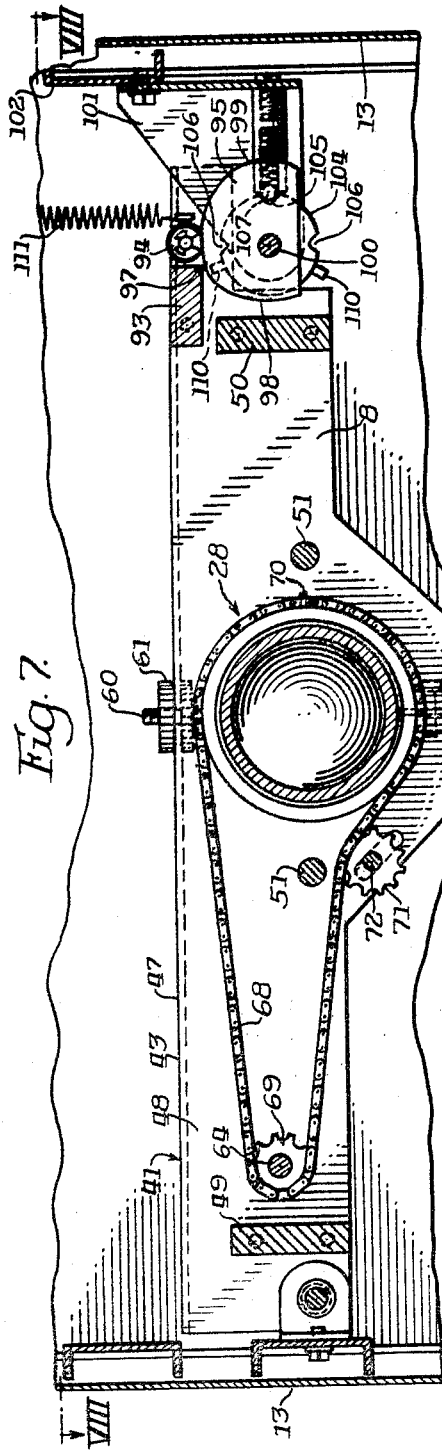
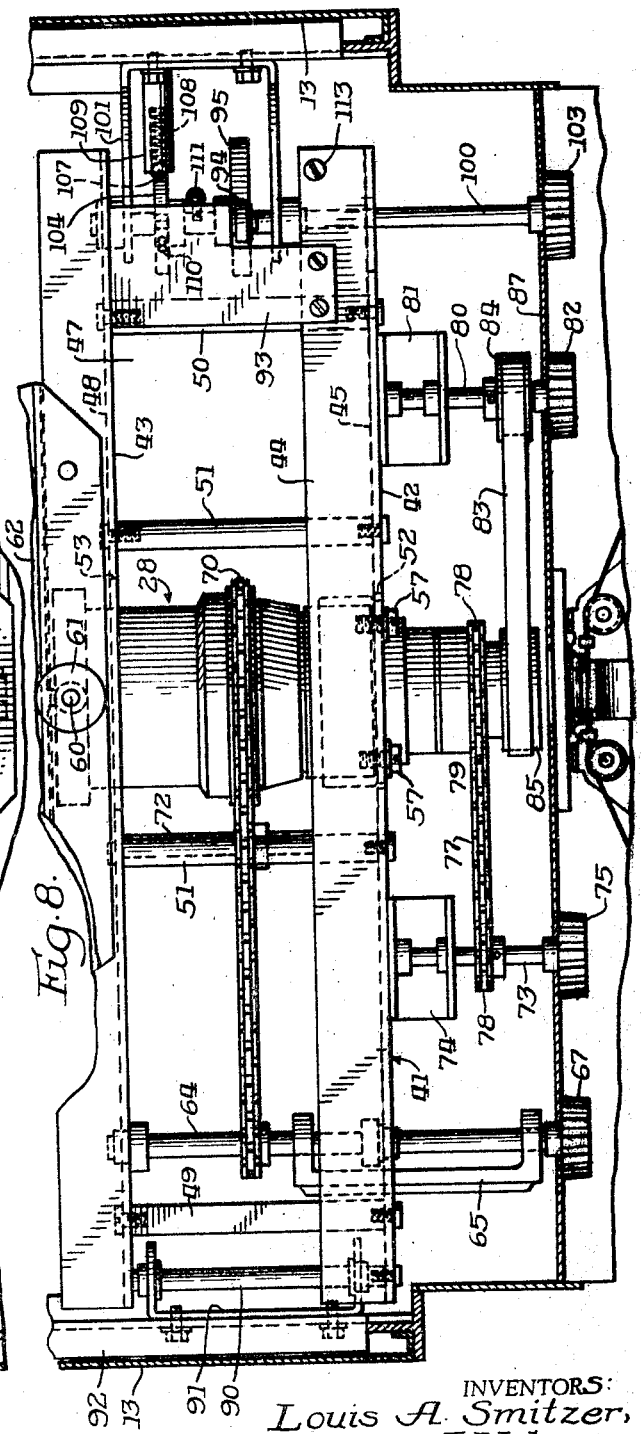
INVENTORS:
Louis A. Smitzer,
Andrew I. Yohana.
By
Atty

United States Patent Office 3,475,091
Patented Oct. 28, 1969

3,475,091
MICROFILM READER DEVICE
Louis A. Smitzer, Chicago, and Andrew I. Yohana, Skokie, Ill., assignors to Bell & Howell Company, Chicago, Ill., a corporation of Illinois
Filed June 28, 1966, Ser. No. 561,100
Int. Cl. G03b 21/28, 21/14, 3/00
U.S. Cl. 353—78    12 Claims

ABSTRACT OF THE DISCLOSURE

In a microfilm reader, a frame, pivotally mounted for generally vertical movement relative to a film gate, on which a lens unit is mounted together with all lens adjustment controls for adjusting movement therewith. The entire frame is moveable to one of plural selected positions for viewing selected images spaced laterally on a strip of microfilm. Vertical movement of the frame is controlled by a cam device on the cabinet and a cam follower on the end of the frame opposite the pivoted end. Cooperating light shields are mounted on the frame and on the cabinet, respectively.

---

This invention relates to microfilm readers, and is more particularly concerned with novel means for conveniently and efficiently projecting and viewing microfilm images in a wide reduction range such as from about 24× to 44× on the same size film, as desired, and interchangeably, and with substantially instant fingertip control.

Much documentary information, business correspondence and records, and the like, is stored on microfilm at about 24× reduction and the microfilm images occupy the available space in centrally disposed series on the film strip. For space saving purposes, greater reductions up to about 44× may be employed and a plurality of longitudinal row series of microfilm images photographed on the same strip of film. This is now commonly done with documents having information on both sides thereof that should be available for retrieval, such as on bank checks, with images of the component faces of each document in side-by-side relation in respective row series on the film strips.

On the other hand, it is highly desirable during retrieval and viewing to have each selected projected document image on the film strip substantially fully enlarged and centered on the viewing screen of the reader, or on a copy sheet where the reader is equipped for viewing and copying. Such full enlargement and centered image reproduction should be attainable whether a 24× or 44× reduction, or any intermediate reduction, is present on the film strip.

It is, accordingly, an important object of the present invention to provide in a microfilm reader a device which will enable quick, efficient selective viewing of images on microfilm located at any desirable position across the width of a strip of microfilm.

Another object of the invention is to provide novel means in a microfilm reader for viewing with equal effectiveness document images located centrally of a microfilm strip or located to either side of the center of the strip and enlarged to substantially maximum extent upon a viewing screen or upon a copy sheet, irrespective of the image size on the strip of film.

Still another object of the invention is to provide a novel zoom lens mount for microfilm readers enabling reading of the images on microfilm whether located centrally or at opposite sides of the center line or the strip of film and irrespective of the size of the microfilm image.

Still another object of the invention is to provide a novel lens mount for microfilm readers enabling efficient selective reading of microfilm images located at different locations across the width of the microfilm strip.

It is also an object of the invention to provide a novel vertical lens adjustment device for microfilm readers having quick and easy fingertip adjustment means.

Other objects, features and advantages of the present invention will be readily apparent from the following detailed description of a preferred embodiment thereof taken in conjunction with the accompanying drawings, in which:

FIGURE 4 is a fragmentary sectional detail view taken substantially along the line IV—IV of FIGURE 2;

FIGURE 5 is a fragmentary plan view of a section of microfilm showing 24× frames;

FIGURE 6 is a plan view of a section of microfilm showing side-by-side 44× frames;

FIGURE 7 is a fragmentary enlarged sectional, elevational detail view taken substantially along the line VII—VII of FIGURE 2, and FIGURE 8 is a plan sectional view taken substantially along the line VIII—VIII of FIGURE 7.

Figure 1:
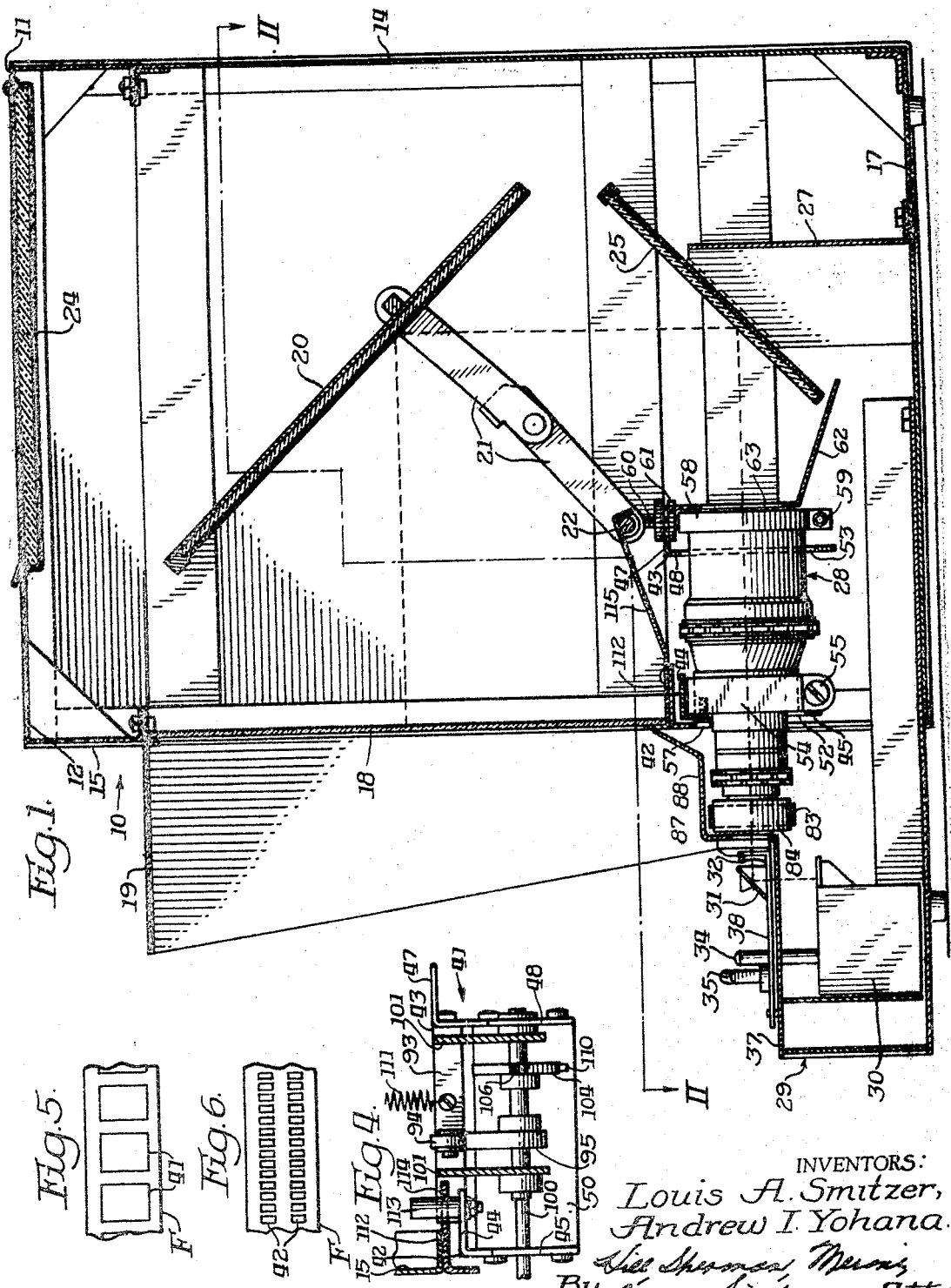
FIGURE 1 is a vertical sectional detail view through a typical microfilm reader embodying features of the invention.

A microfilm reader 10 embodying features of the invention comprises a cabinet 11 having a top wall 12, opposed sidewalls 13, a rear wall 14, a front wall 15 and a bottom wall 17.

Within the substantially light-tight enclosure defined by the cabinet are optical means for impinging an enlarged microfilm image on the inner or rear side of a viewing screen 18 mounted in a suitable opening in the front wall 15 and having thereabout a shielding hood 19. Included in the optical system for this purpose is a diagonal mirror 20 mounted on a linkage mechanism 21 carried by a shaft 22 journalled on and between the sidewalls 13 and selectively oscillatably operable by means of an actuating handle 23 interiorly of the housing to move the mirror 20 between a position as shown to impinge the image toward the screen 18 and a position wherein the image is transmitted to a horizontal glass platen 24, or the like mounted in or on the top wall 12 for producing a facsimile or copy of the selected document of the microfilm image.

Further elements of the optical system comprise an angularly rearwardly and upwardly inclined mirror 25 fixedly mounted on a bracket 27 attached to the base wall 17. Trained to direct the image toward the mirror 25 is a generally horizontally mounted lens assembly unit 28 located on a front to rear axis in the lower front portion of the cabinet 10 and having a forward end portion within a combination lamp and mechanism housing and film platform or deck structure generally shown at 29 attached to and projecting forwardly from the lower portion of the cabinet. With the enclosure of the housing 29 is a lamp housing 30 within which a projection lamp provides the illumination for a light beam schematically indicated by a dash line which is directed upwardly to an inclined mirror 31 by which the beam is directed rearwardly through a film slot or gate 32 and through the lens unit 28.

Microfilm F is trained to travel through the film gate 32 in a vertical plane and running in a horizontal direction and, as shown, between carrying reels 33 one of which is mounted on a righthand driven spindle 34 and the other of which is mounted on a lefthand driven spindle 35 extending upwardly through a deck 37. Alternative to the reels 33, a microfilm cartridge according to the disclosure in copending application of L. A. Smitzer et al., Ser. No. 412,620; now Patent No. 3,354,776; may be employed and for this purpose a platform 38 is provided on the deck 37 aligned with the film gate 32 and having another film spindle 39 projecting upwardly therethrough complementary to the spindle 34 and symmetrically located relative thereto for this purpose. Suitable means for controlling the operation of the film to run toward the left or toward the right through the film gate 32 include a control knob 40 mounted at a convenient location on the deck 37 for easy manipulation by the operator of the reader.

Microfilm is generally of 16 millimeter strip width. On this strip a longitudinal centered area of about 10 millimeters carries the microfilm images. For larger size documents photographed microfilm images 41 (FIG. 5) of about 24× reduction occupy the full width of the image area. It is customary for smaller size documents, and more particularly documents which have information on opposite faces thereof which should be photographed in correlated position on the film strip, to have the film F carry within the central image area two longitudinal transversely correlated series of images 42 (FIG. 6). Conveniently these smaller images are in 44× reduction. This creates a reading problem where it becomes necessary to use the same microfilm reading machine to find and view and make copies of documents which have been microfilm at 24× or 44× or some intermediate reduction as may be expedient for the particular type of documents and storage and retrieval needs.

According to the present invention means are provided for quickly, easily and efficiently meeting the problem of interchangeable or alternative use of the reader for scanning microfilm information images throughout the practical image reduction range and substantially centered on the screen 18 or on the copy plate 24. For attaining substantially full size scanning images from microfilm images photographed at different reduction ratios, without lens changes and with virtually instantaneous fingertip control, the lens system assembly or unit 28 is of the zoom lens type as described in detail in the aforesaid copending Patent No. 3,354,776. This unit embodies within a suitable elongated tubular housing structure a coaxially related set of cooperative lenses and image rotation means comprising a dove prism. Mounting of the lenses and prism is so sectionalized and relatively adjustably organized as to afford, in addition to image rotation, focusing and zoom adjustment. Then, in order to have the projected image substantially centered on the viewing screen 18 or the copying plate 24, irrespective of whether the recorded image is centered in the image area of the film F as in FIGURE 5 or above or below the longitudinal center line of the image area as in FIGURE 6, the zoom lens unit 28 is mounted for substantially vertical adjustment to correspond to the position on the film of the projected image. Thereby not only are 24× images projectable into substantially full screen size, but also, at the other extreme, 44× images are projectable to substantially full viewing screen size and centered on the screen.

Mounting of the lens unit 28 for fingertip vertical adjustment comprise an elongated rockably mounted frame 41 extending transversely across the inner lower front portion of the chamber within the cabinet 10 between and having its respective opposite ends adjacent to the sidewalls 13. For this purpose, the lens mounting frame 41 comprises a pair of respective front and rear longitudinally coextensive frame body bars 42 and 43 of generally inverted L-shaped cross section. On the front frame bar 42 is a generally horizontally disposed rearwardly extending relatively narrow top flange 44 and a substantially wider vertically extending flange 45. Similarly, the rear body frame bar 43 has a relatively narrow rearwardly extending horizontally disposed top flange 47 and a vertically extending wider flange 48. Desirably the top flange 47 is at a slightly higher elevation than the top flange 44. Means rigidly connecting the frame bars 42 and 43 into unitary frame relationship spaced suitably apart are a front to rear frame bar 49 secured fixedly to and between the vertical flanges 45 and 48 adjacent to but spaced from one of the coextensive ends of the frame bars, a similar such front-to-rear frame bar 50 secured to and between the flanges 45 and 48 adjacent to but spaced from the opposite ends of the body frame bars, and a pair of connecting and spacer rods 51 spaced from the respective frame bars 49 and 50 and suitably spaced from one another adjacent to respective lens clearance openings 52 and 53 in the flanges 45 and 48 (FIGS. 1 and 8).

Attachment of the housing of the lens unit 28 in fixed operative position on the mounting frame 41 and extending through the openings 52 and 53 is by means of suitable brackets attached to the frame bars 42 and 43. For this purpose a split clamp bracket 54 engages about the lens housing and is secured fixedly thereto by means of a screw 55 and is secured within the re-entrant angle of the frame bar 42 by means of screws 57 on the flange 45. Attachment of the lens housing to the rear body frame bar 43 is by means of a split clamp bracket 58 engaging about the inner end portion of the lens housing and fixedly clamped thereon through the action of a screw 59. On its upper end the clamp 58 has an upwardly extending threaded stud 60 which extends upwardly through the flange 47 and has threadedly carried thereon opposed manually operable lock nuts 61 by which the inner or rear end of the lens housing is vertically adjustably fixedly secured to the frame with the lens assembly properly oriented in optical prealignment relative to the remainder of the optical track or system including the mirrors 22 and 25 and 31. Also carried by the rear frame bar 43 is a suitable angular light shield plate 62 aligned with the rear end of the lens housing extending downwardly and rearwardly to underlie the lower edge of the mirror 25 and having a suitable size light beam aperture 63 coaxial with the opening in the innermost end of the lens housing.

Means for controlling operations of the zoom lens unit 28 are carried by the mounting frame 41 and are conveniently operable by finger control means at the front of the reader. For this purpose a zoom adjustment shaft 64 is rotatably mounted on and between the frame bar flanges 45 and 48 and on a bracket 65 which supports a forwardly projecting portion of the shaft having thereon an adjustment knob 67. Zoom adjustment rotation of the shaft 64 is transmitted through a flexible endless drive member such as a sprocket chain 68 trained over a sprocket 69 on the shaft 64 and over another sprocket or pin 70 forming part of a zoom adjustment ring in the zoom lens assembly 28. Slack takeup in the chain 68 is effected through an adjustable idler sprocket 71 (FIG. 7) carried by a shaft 72 rotatably mounted on and between the frame bar flanges 45 and 48.

For image rotation turning of the associated dove prism in the zoom lens assembly 28, a digitally operable shaft 73 is rotatably mounted on a bracket 74 attached to the frame flange 45 and projects forwardly therefrom, with a finger control knob 75 on the outer or forward end of the shaft. Rotary motion of the shaft 73 is transmitted through an endless flexible drive member such as a sprocket chain 77 trained over a sprocket 78 on the shaft 73 and over a ring gear 78 on a prism turning ring 79 of the zoom lens assembly.

Focusing is effected by digital rotation of a shaft 80 rotatably mounted on a bracket 81 on the outer or forward side of the frame flange 45 and projection forwardly therefrom with a finger control knob 82 on the outer or forward end of the shaft. Rotary motion of the shaft 80 is transmitted through an endless flexible member such as a friction belt 83 trained over a pulley 84 fixed to the shaft 80 and a focusing ring 85 on the front end portion of the zoom lens unit housing.

Figure 2:
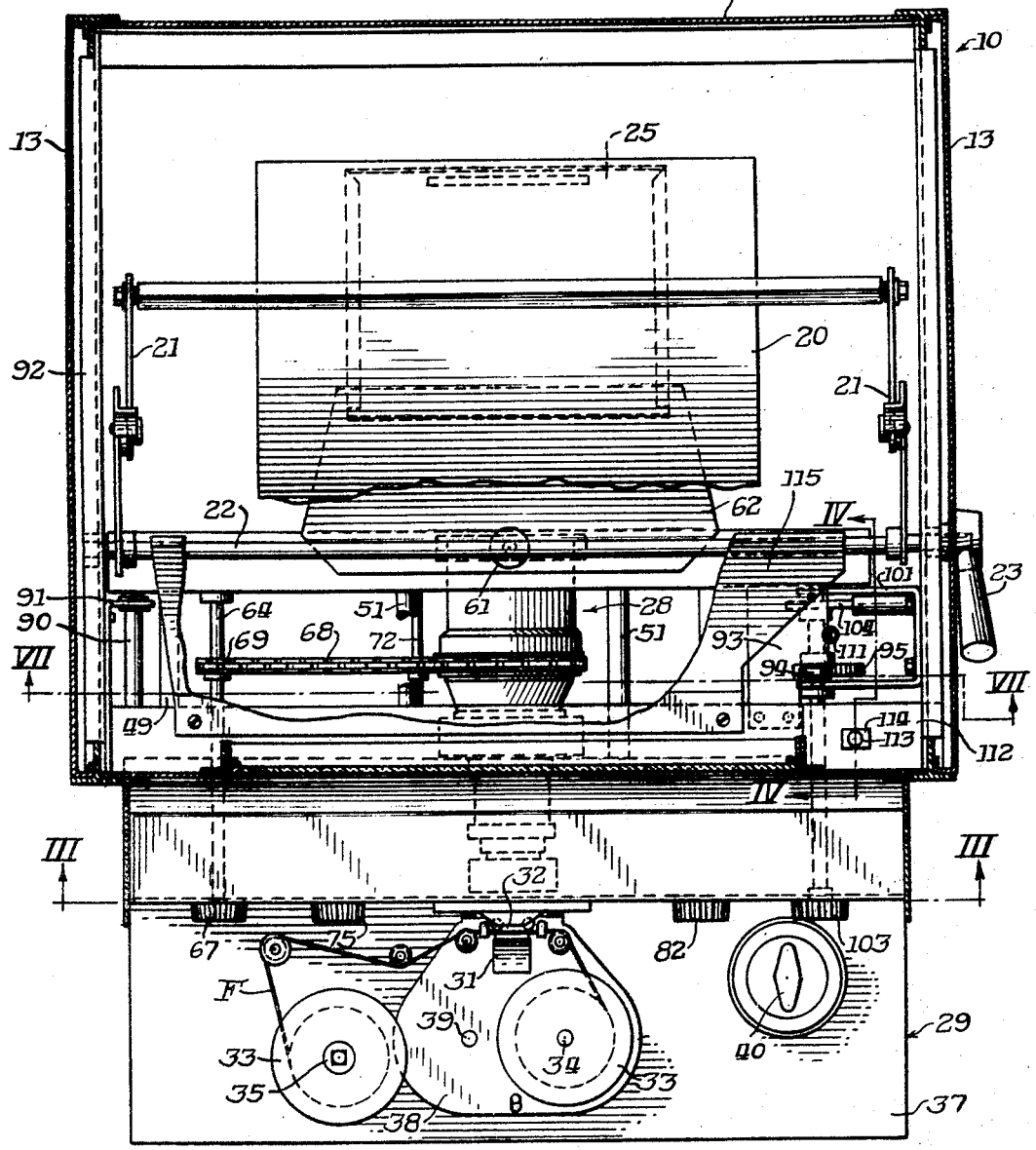
FIGURE 2 is a sectional plan view taken substantially on the irregular section line II—II of FIGURE 1.
Figure 3:
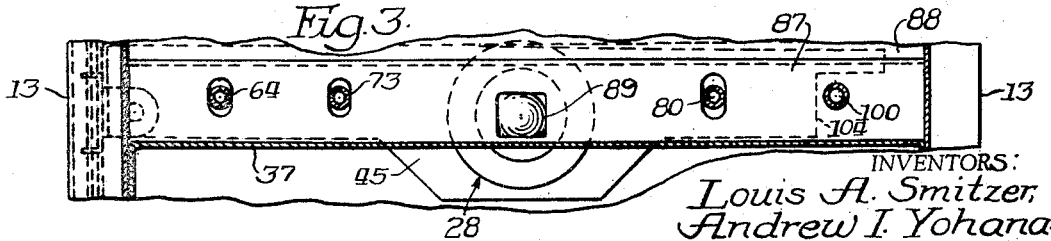
FIGURE 3 is a sectional elevational detail view taken substantially along the line III—III of FIGURE 2.

Accessibility of the control knobs 67, 75 and 82 is conveniently arranged along a front vertical wall portion 87 of a hood structure 88 on the upper rear part of the housing 29 cooperating with the front wall 15 of the cabinet and accommodating the front portion of the zoom lens housing and operating mechanism (FIGS. 1, 2 and 8). Suitable clearance openings, as shown in FIG. 3, are provided for passage of the shafts 64, 73 and 80 in the hood wall 87. In addition, such wall has a projection aperture 89 coaxially aligned with the film gate 32 and with which the zoom lens unit 28 is aligned.

Means are provided for fingertip adjustment of the lens mounting frame between a plurality of operative vertical positions of the zoom lens axis relative to the film gate 32 and the aperture 89. For this purpose, one end of the frame 41 is pivotally mounted to provide a fulcrum, in the manner of a second class lever, while the opposite end has associated therewith means for adjustably swinging the frame about the fulcrum. Suitable fulcrum means comprise a shaft 90 carrying the mounting frame by having its end portions extending through the flanges 45 and 48 and mounted on a bracket 91 secured fixedly to a frame bar 92 rigid with the cabinet frame along the inner side of the adjacent sidewall 13.

On its opposite end portion, the frame 41 has a frame bar 93 which generally overlies the frame bar 50 and carries a follower roller 94 which engages the perimeter of the lobe disc cam 95. This cam has three smoothly transitional lobe position areas comprising a neutral position area 97, a lowermost position area 98 and a high position area 99 (FIG. 7). Mounting the cam 95 rotatably is a shaft 100 journalled on a bracket 101 suitably secured fixedly to a front-to-rear frame bar 102 of the cabinet 10 inside the adjacent sidewall 13. Fingertip operation of the shaft 100 is effected by means of a suitable control knob 103 (FIGS. 2 and 8) on the forward end portion of the shaft 100 which extends freely through a clearance cutout 104 in the adjacent end portion of the frame flange 45 and is journalled through the hood wall 87.

Since the cam 95 is hidden from view of the operator, means are provided for at least touch-sensitive detenting and also audible clicking in the three adjustment positions. Conveniently such means comprise a latch disc 105 corotatably mounted on the shaft 100 and having three detent notches 106 in its perimeter spaced 90° apart and respectively corresponding to the adjustment cam lobe areas 97, 98 and 99 of the adjustment cam. Torque releasably engageable in the respective notches 106 is a ball detent 107 normally biased as by means of a compression spring 108 from a socket opening from a detent carrier bar or rod 109 attached to the bracket 101 so that the detent ball 107 normally thrusts against the perimeter of the latch wheel or disc 105. To avoid positively any overrun of the latch wheel 105 beyond the upper and lower cam adjustment positions 98 and 99, a pair of stop lugs 110 project from the perimeter of the detent latch disc to engage the bar or post 109 as a fixed stop at the respective opposite limits of rotary adjustment. If desired, of course, suitable visible indicia and indexing means may be provided in association with the operating knob 103 and the wall 87 for guiding the operator in effecting vertical adjustments of the zoom lens unit.

When it is desired to position the zoom lens for scanning centrally exposed microfilm images 41, the zoom lens is adjusted to the neutral position as shown in FIGURE 7. Should it be desired to scan the lower row of the smaller ratio images 42, the zoom lens is adjusted to its lowermost position by turning the cam 95 until the low point lobe position 98 is engaged by the anti-friction follower 94. Adjustment to scan the upper row of images 42 is effected by turning the cam 95 to engage the follower 94 with the high point area 99 of the cam. The leverage length from the pivot or fulcrum 90 to the point of engagement of the cam 95 by the follower 94 is so related to the optical axis of the zoom lens unit 28, and the relationship of the control points on the perimeter of the cam lobe are such that movement of the lens axis from the neutral position is about 4 mm. up or down. Although adjustments can be easily effected through the cam 95 due to the efficient leverage relationships, they are desirably additionally facilitated by partial counterbalancing means tending to relieve downward pressure of the follower 94 against the cam. Such means conveniently comprise a tension spring 111 attached to the rocker frame bar 93 and extending upwardly therefrom and attached to a fixed portion of the cabinet.

A stop against excessive upward swinging of the frame 41, such as might be occasioned by jostling or tilting of the cabinet 12 during transportation or otherwise, is provided by an overhanging flange 112 (FIGS. 1, 2 and 4) comprising part of the front wall frame structure of the cabinet spaced a predetermined distance above the rocker frame bar flange 44. Means to prevent displacement of the frame 41 in a front-to-rear direction at its cam-supported end comprise an upwardly projecting rigid guide finger 113 freely slidably projecting through a suitable aperture 114 in the flange 112, with the front and rear edges defining this aperture providing retaining surfaces opposing the finger 113. Desirably, the flange 112 also serves as a support for a light guard or baffle plate 115 which extends rearwardly and upwardly below the screen 118 to shield against undesirable reflection from the mirror 25 or other distracting reflections, or bounceback of light from the screen to the mirror 25, thereby avoiding fadeout and assuring a sharp, clear projected image on the screen.

It will be understood that variations and modifications may be effected without departing from the spirit and scope of the novel concepts of this invention.

We claim as our invention:

1. A microfilm reader comprising:
   a cabinet having a generally vertically disposed screen for viewing a projected image;
   a light source;
   an optical system for magnifying a microfilm image and projecting such image onto the screen and including a lens unit optically aligned with said light source;
   means providing a film gate to receive a film strip in scanning relation between said light source and said lens unit;
   frame means pivotally mounting said lens unit for generally vertical adjustment relative to said film gate and perpendicular to the optical axis of said lens unit for scanning images located at various positions transversely of the microfilm strip;
   means for simultaneous substantially instantaneous fingertip vertical adjustment of said frame means and said lens unit;
   and means mounted on said frame means for adjusting said lens unit.

2. A reader as defined in claim 1 in which said lens unit comprises a zoom lens and further includes a dove prism for selectively rotating the projected image, and means mounted on said frame for adjusting said prism.

3. A reader as defined in claim 1, including focus adjusting means for said lens unit and mounted on said frame.

4. A reader as defined in claim 1, including a light shield plate mounted on and movable with said frame.

5. A reader as defined in claim 4, including a light shield plate mounted on said cabinet and cooperating with said frame-carried light shield in eliminating image-diffusing glare within the cabinet in respect to said screen.

6. A microfilm reader device for vertically adjusting a lens assembly in an optical system between a film gate and a viewing screen for enabling centered projection of images on the screen scanned from different vertical areas of a horizontally running microfilm strip;

a supporting frame elongated in a generally horizontal direction and having the lens assembly mounted with its optical axis horizontal on an intermediate portion thereof;

means for pivotally fulcruming said frame at one end thereof, cam follower means on the opposite end of said frame; and cam means engaging said cam follower means for effecting rocking adjustments of the frame around said fulcrum by vertically adjusting said opposite end of the frame whereby to determine the vertical position of the lens assembly in alignment with the microfilm image being scanned.

7. A device as defined in claim 6, in which said cam comprises a lobe having three positions comprising a neutral position, a low position and a high position, and means for detenting the cam in said respective positions relative to said follower.

8. A device as defined in claim 6, including means for at least partially counterbalancing said frame in respect to said cam means.

9. A device s defined in claim 6, including a shaft for operating said cam means having fingertip control means thereon.

10. A device as defined in claim 6, including means for avoiding undesirable displacement of said opposite end portion of the frame beyond a predetermined range of adjustment movement.

11. A device as defined in claim 6, including means guarding against displacement of said opposite end of the frame in a direction transverse thereto.

12. A device as defined in claim 6, in which said lens assembly comprises a zoom lens having means for zooming adjustment, means for image rotation adjustment and means for focusing adjustment, and manually operable means mounted on said frame for respectively controlling said zoom lens adjusting means.

References Cited

UNITED STATES PATENTS

| | | |
|---|---|---|
| 2,747,456 | 5/1956 | Waller et al. |
| 2,930,297 | 3/1960 | Moyroud _____ 95—4.5 |
| 2,937,569 | 5/1960 | Wilton. |
| 3,354,776 | 11/1967 | Smitzer et al. |

NORTON ANSHER, Primary Examiner

R. M. SHEER, Assistant Examiner

U.S. Cl. X.R.

353—26, 75, 76, 101